(12) United States Patent
Lin

(10) Patent No.: US 12,726,921 B2
(45) Date of Patent: Sep. 1, 2026

(54) USER EQUIPMENT AND METHOD OF TRANSMISSION OF SAME

(71) Applicant: GUANGDONG OPPO MOBILE TELECOMMUNICATIONS CORP., LTD., Dongguan Guangdong (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 472 days.

(21) Appl. No.: 18/071,504

(22) Filed: Nov. 29, 2022

(65) Prior Publication Data

US 2023/0112090 A1 Apr. 13, 2023

Related U.S. Application Data

(63) Continuation of application No. PCT/IB2020/000786, filed on May 29, 2020.

(51) Int. Cl.
*H04W 56/00* (2009.01)
*H04L 27/26* (2006.01)

(52) U.S. Cl.
CPC ..... *H04W 56/001* (2013.01); *H04L 27/26025* (2021.01)

(58) Field of Classification Search
CPC ....................... H04W 56/001; H04L 27/26025
See application file for complete search history.

(56) References Cited

U.S. PATENT DOCUMENTS

| | | | | |
|---|---|---|---|---|
| 12,126,554 | B2 * | 10/2024 | Sakhnini | H04L 5/0048 |
| 2012/0163223 | A1 * | 6/2012 | Lo | H04L 5/0053 370/312 |
| 2015/0023263 | A1 * | 1/2015 | Son | H04L 27/2647 370/329 |
| 2016/0270015 | A1 * | 9/2016 | Lin | H04W 56/0015 |
| 2016/0277225 | A1 * | 9/2016 | Frenne | H04L 5/0048 |
| 2018/0049113 | A1 * | 2/2018 | Jung | H04W 56/0005 |
| 2018/0123849 | A1 * | 5/2018 | Si | H04L 27/2613 |
| 2019/0053177 | A1 | 2/2019 | Niu | |
| 2019/0132170 | A1 | 5/2019 | Si et al. | |
| 2019/0173628 | A1 * | 6/2019 | Ko | H04W 72/0453 |
| 2019/0173719 | A1 * | 6/2019 | Qin | H04L 27/26136 |
| 2019/0357204 | A1 * | 11/2019 | Matsumura | H04L 27/2613 |
| 2019/0394747 | A1 * | 12/2019 | Akkarakaran | H04L 5/0007 |
| 2020/0344097 | A1 | 10/2020 | Si et al. | |
| 2021/0068101 | A1 * | 3/2021 | Chen | H04L 1/0072 |
| 2021/0083911 | A1 * | 3/2021 | Morozov | H04L 27/2636 |
| 2021/0092737 | A1 * | 3/2021 | Tang | H04W 72/20 |
| 2021/0168574 | A1 * | 6/2021 | Zhang | H04L 5/0048 |

(Continued)

OTHER PUBLICATIONS

InterDigital Inc. "On Synchronization Mechanism and Procedures for Nr V2X Sidelink", 3GPP TSG RAN WG1 #96 R1-1902597, Athens, Greece, Feb. 25-Mar. 1, 2019, all pages.

(Continued)

*Primary Examiner* — Otis L Thompson, Jr.
(74) *Attorney, Agent, or Firm* — Ladas & Parry, LLP

(57) ABSTRACT

A user equipment (UE) and a method of transmission of the same are provided. The method includes transmitting a first transmission, wherein the first transmission is used for synchronization and the first transmission occupies a bandwidth more than 11 resource blocks (RBs).

14 Claims, 9 Drawing Sheets

300

302 Transmitting a first transmission, wherein the first transmission is used for synchronization and the first transmission occupies a bandwidth more than 11 resource blocks

(56) References Cited

U.S. PATENT DOCUMENTS

| | | | | |
|---|---|---|---|---|
| 2021/0368460 | A1* | 11/2021 | Fakoorian | H04L 5/0048 |
| 2021/0368466 | A1* | 11/2021 | Fakoorian | H04W 56/0015 |
| 2022/0140967 | A1* | 5/2022 | Khoryaev | H04L 5/0048 375/220 |
| 2022/0225119 | A1* | 7/2022 | Liberg | H04B 7/18513 |
| 2022/0353048 | A1* | 11/2022 | Kim | H04L 5/06 |

OTHER PUBLICATIONS

Convida Wireless, "Design Considerations for NR V2X Synchronization", 3GPP TSG-RAN WG1 Meeting #96 R1-1903155, Athens, Greece, Feb. 25-Mar. 1, 2019, all pages.
International Search Report in the international application No. PCT/IB2020/000786, mailed on Feb. 8, 2021.
Written Opinion of the International Search Authority in the international application No. PCT/IB2020/000786, mailed on Feb. 8, 2021.

* cited by examiner

| | S-PSS | | S-SSS | | PSBCH | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
FIG. 5
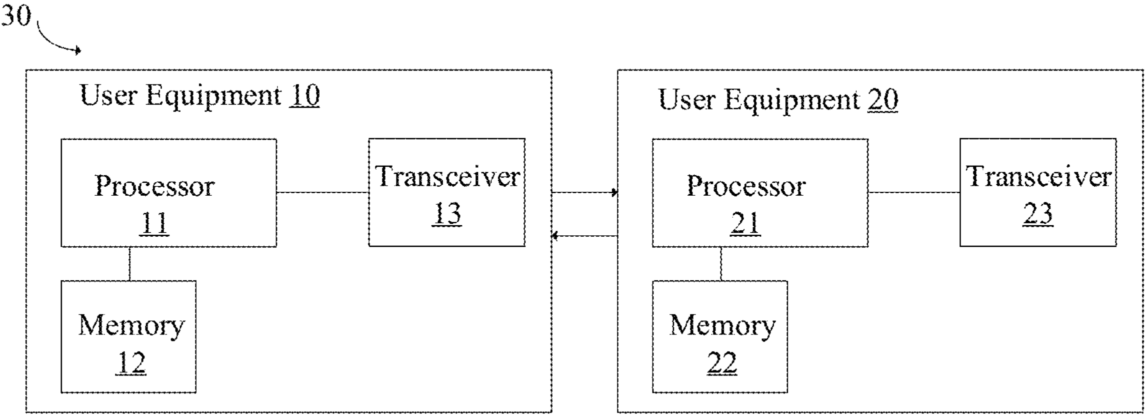
FIG. 6
300
302
Transmitting a first transmission, wherein the first transmission is used for synchronization and the first transmission occupies a bandwidth more than 11 resource blocks
FIG. 7
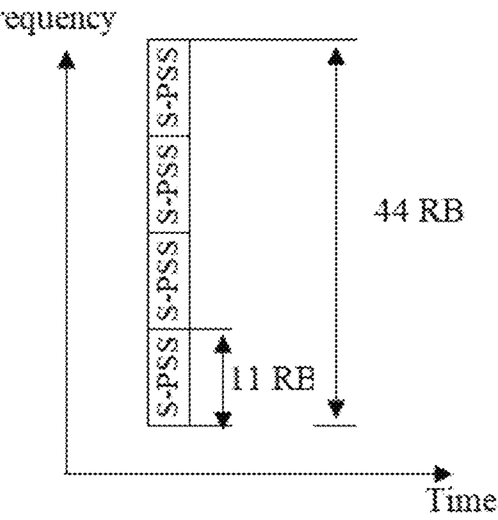
FIG. 8

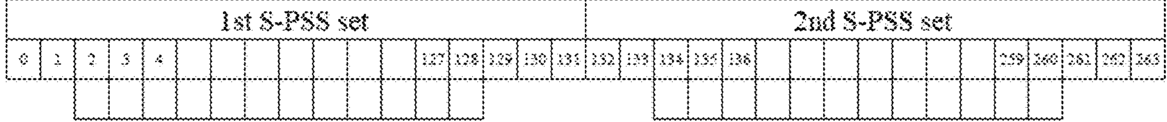
FIG. 9
1st S-PSS set
2nd S-PSS set
0 1 2 3 4 127 128 129 130 131 132 133 134 135 136 259 260 261 262 263
FIG. 10
1st S-PSS set
2nd S-PSS set
0 1 2 3 4 127 128 129 130 131 132 133 134 135 136 259 260 261 262 263
FIG. 11
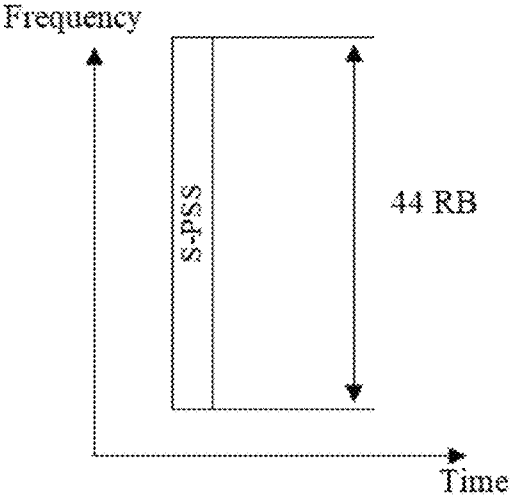
FIG. 12

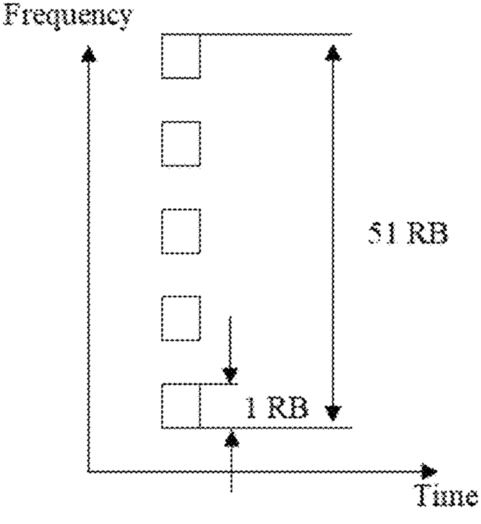
FIG. 13
1st RB
2nd RB
11th RB
FIG. 14
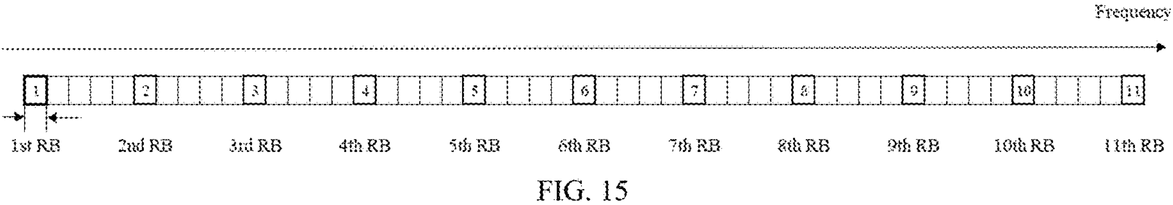
FIG. 15

Frequency

51 RB

Time

USER EQUIPMENT AND METHOD OF TRANSMISSION OF SAME

CROSS-REFERENCE TO RELATED APPLICATION

This is a continuation application of International Patent Application No. PCT/IB2020/000786, filed on May 29, 2020, entitled "USER EQUIPMENT AND METHOD OF TRANSMISSION OF SAME", the disclosure of which is hereby incorporated by reference in its entirety.

BACKGROUND OF DISCLOSURE

Device-to-device communication is a D2D-based sidelink (SL) transmission technology, which is different from a conventional cellular system in that communication data is received or sent through a base station, so it has a higher spectrum efficiency and lower transmission delay. The car-to-vehicle system adopts a D2D direct communication method, and 3GPP defines two transmission modes: a first mode and a second mode.

The first mode: transmission resources of a terminal are allocated by the base station, and the terminal sends data on side-link according to the resources allocated by the base station. The base station can allocate the resources for a single transmission to the terminal, or can allocate semi-static transmission for the terminal resources. FIG. 1 illustrates sidelink communication in a coverage of a network. As illustrated in FIG. 1, a terminal (such as a user equipment, UE) is located within the coverage of the network, and the network allocates transmission resources used by the terminal for side transmission.

In new radio vehicle-to-everything (NR-V2X), it is necessary to support automatic driving, so it puts forward higher requirements for data interaction between vehicles, such as higher throughput, lower delay, higher reliability, greater coverage, more flexible resource allocation, etc.

In long term evolution (LTE)-V2X, broadcast transmission is supported. In NR-V2X, unicast and multicast transmission methods are introduced. For unicast transmission, there is only one terminal at the receiving end. As illustrated in FIG. 2, unicast transmission is performed between UE1 and UE2. For multicast transmission, the receiving end is all terminals in a communication group, or is in a certain transmission. All terminals within the distance, as illustrated in FIG. 3, UE1, UE2, UE3, and UE4 form a communication group, in which UE1 sends data, the other terminal devices (UE2, UE3, and UE4) in the group are all receiver terminals. For broadcast transmission, as illustrated in FIG. 4, UE1 is the sending terminal, and other terminals (UE2, UE3, UE4, UE5, and UE6) around UE1 are all receiving terminals.

In an unlicensed band, an unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

In unlicensed band, a method of synchronization signal design for sidelink in unlicensed band is still an open issue. Therefore, there is a need for a user equipment (UE) and a method of transmission of the same, which can solve issues in the prior art and provide a method for sidelink synchronization signal in unlicensed spectrum.

SUMMARY

The present disclosure relates to the field of communication systems, and more particularly, to a user equipment (UE) and a method of transmission of the same.

In a first aspect of the present disclosure, a method of transmission of a user equipment (UE) includes transmitting a first transmission, wherein the first transmission is used for synchronization and the first transmission occupies a bandwidth more than 11 resource blocks (RBs).

In a second aspect of the present disclosure, a UE includes a memory, a transceiver, and a processor coupled to the memory and the transceiver. The processor is configured to transmit a first transmission, wherein the first transmission is used for synchronization and the first transmission occupies a bandwidth more than 11 resource blocks (RBs).

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 5 is a schematic diagram illustrating a sidelink synchronizations signal structure.

FIG. 6 is a block diagram of user equipments (UEs) of communication in a communication network system according to an embodiment of the present disclosure.

FIG. 7 is a flowchart illustrating a method of transmission of a UE according to an embodiment of the present disclosure.

FIG. 8 is a schematic diagram illustrating an example of PSS transmission for sidelink according to an embodiment of the present disclosure.

FIG. 9 is a schematic diagram illustrating an example of a base sequence according to an embodiment of the present disclosure.

FIG. 10 is a schematic diagram illustrating an example of a base sequence according to an embodiment of the present disclosure.

FIG. 11 is a schematic diagram illustrating an example of a base sequence according to an embodiment of the present disclosure.

FIG. 12 is a schematic diagram illustrating an example of PSS transmission for sidelink according to an embodiment of the present disclosure.

FIG. 13 is a schematic diagram illustrating an example of PSS transmission for sidelink according to an embodiment of the present disclosure.

FIG. 14 is a schematic diagram illustrating an example of a base sequence according to an embodiment of the present disclosure.

FIG. 15 is a schematic diagram illustrating an example of splitting the number of used RBs to wider bandwidth with an interlaced pattern according to an embodiment of the present disclosure.

DETAILED DESCRIPTION OF EMBODIMENTS

Figure 1:
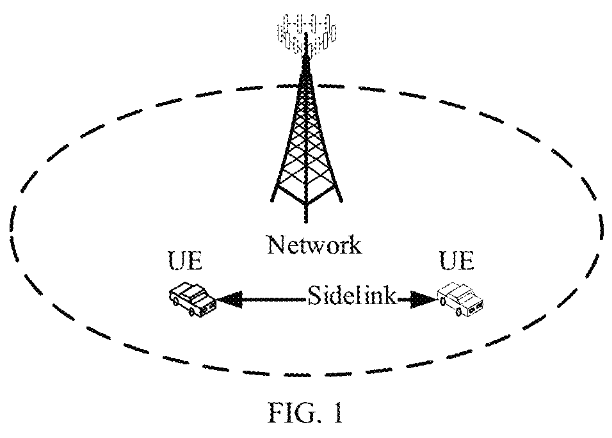
FIG. 1 is a schematic diagram illustrating sidelink communication in a coverage of a network.
Figure 2:
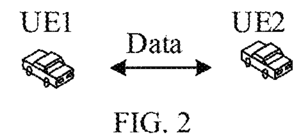
FIG. 2 is a schematic diagram illustrating sidelink unicast transmission.
Figure 3:
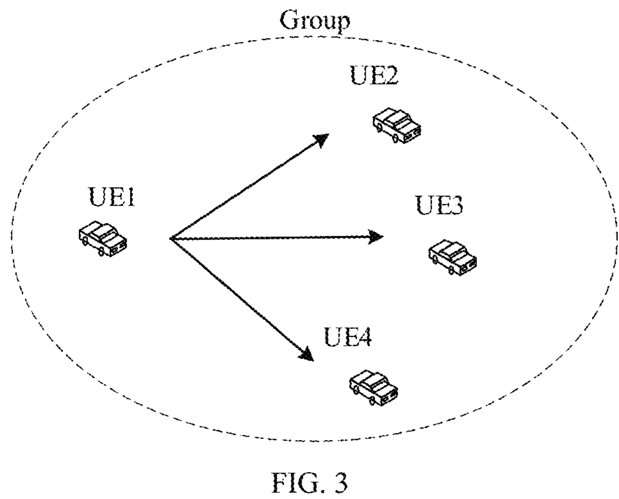
FIG. 3 is a schematic diagram illustrating sidelink multicast transmission.
Figure 4:
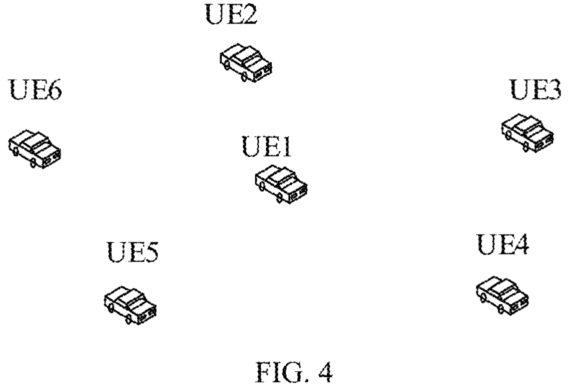
FIG. 4 is a schematic diagram illustrating sidelink broadcast transmission.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For communication in sidelink between user equipments (UEs), synchronization should be maintained. To this end, a UE of a sidelink (SL) group needs to send a synchronization signal. In Release 16, SL synchronization signal structure is illustrated in FIG. 5, where the synchronization signal comprises SL primary synchronization signal (S-PSS), SL secondary synchronization signal (S-SSS) and SL physical broadcast channel (PSBCH). This synchronization signal has a bandwidth equal to 11 RBs.

In unlicensed band, there is a regulation imposing that for every transmission in a 20 Mhz band, an actual transmission ensures at least 80% of the bandwidth usage, that is, occupancy channel bandwidth (OCB) requirement.

For SL communications in unlicensed band, synchronization signal transmission needs to satisfy OCB requirement. In some embodiments, a method for a design of SL synchronization signal in unlicensed spectrum is provided.

FIG. 6 illustrates that, in some embodiments, a user equipment (UE) 10 and a UE 20 of communication in a communication network system 30 according to an embodiment of the present disclosure are provided. The communication network system 30 includes the UE 10 the UE 20. The UE 10 may include a memory 12, a transceiver 13, and a processor 11 coupled to the memory 12, the transceiver 13. The UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V21/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to transmit a first transmission, wherein the first transmission is used for synchronization and the first transmission occupies a bandwidth more than 11 resource blocks (RBs). This can solve issues in the prior art and provide a method for sidelink synchronization signal in unlicensed spectrum.

FIG. 7 illustrates a method 300 of communication of a UE according to an embodiment of the present disclosure. In some embodiments, the method 300 includes: a block 302, transmitting a first transmission, wherein the first transmission is used for synchronization and the first transmission occupies a bandwidth more than 11 resource blocks (RBs). This can solve issues in the prior art and provide a method for sidelink synchronization signal in unlicensed spectrum.

In some embodiments, the first transmission comprises at least one of the following: a primary synchronization signal (PSS); a secondary synchronization signal (SSS); or a physical broadcast channel (PBCH). In some embodiments, the first transmission comprises M RBs in frequency domain, where M is an integer greater than 11 RBs and M is related to subcarrier spacing and/or a reference bandwidth and/or a number of subcarrier in an RB. In some embodiments, the reference bandwidth is 20 MHz. In some embodiments, the reference bandwidth is a percentage of 20 MHz, wherein the percentage is pre-defined. In some embodiments, the M RBs comprise the RBs from the lowest RB to the highest RB of the first transmission in the frequency domain. In some embodiments, the first transmission is transmitted in the M RBs or a subset of the M RBs. In some embodiments, the first transmission comprises m subset transmissions, where m is an integer greater than or equal to 1. In some embodiments, the m subset transmissions are transmitted in different RBs of the M RBs in the frequency domain. In some embodiments, at least one subset of the m subset transmissions is based on a first base sequence. In some embodiments, the first base sequence has a length related to the values M and/or m and/or the number of subcarriers in an RB. In some embodiments, the number of subcarriers in an RB is 12.

In some embodiments, the length of the first base sequence is a prime value. In some embodiments, the m subset transmissions are based on the same first base sequence. In some embodiments, the m subset transmissions are applied with different phase rotations. In some embodiments, the first transmission is transmitted in K symbols, where K is an integer greater than or equal to 1. In some embodiments, the K symbols are consecutive in time domain.

In some embodiments, the first transmission comprises at least one SSS and at least one PBCH, and the at least one SSS and the at least one PBCH are fully or partially overlapped in time domain. In some embodiments, a bandwidth of the at least one PBCH is greater than a bandwidth of the at least one SSS. In some embodiments, a bandwidth of the at least one PBCH comprises the number of RB between the lowest RB and the highest RB of the at least one PBCH. In some embodiments, a bandwidth of the at least one SSS comprises the number of RB between the lowest RB and the highest RB of the at least one SSS. In some embodiments, the at least one PBCH comprises at least one symbol, and the at least one SSS comprises at least one symbol, wherein the last least one symbol of the at least one SSS is the same as the at least one symbol of the at least one PBCH. In some embodiments, all symbols of the at least one SSS comprise a PBCH and at least one symbol of the PBCH only comprises a PBCH.

In some embodiments, the first transmission comprises at least one PSS and at least one PBCH, and the at least one PSS and the at least one PBCH are fully or partially overlapped in time domain. In some embodiments, a bandwidth of the at least one PBCH is greater than a bandwidth of the at least one PSS. In some embodiments, a bandwidth of the at least one PBCH comprises the number of RB between the lowest RB and the highest RB of the at least one PBCH. In some embodiments, a bandwidth of the at least one PSS comprises the number of RB between the lowest RB and the highest RB of the at least one PSS. In some embodiments, the at least one PBCH comprises at least one symbol, and the at least one PSS is on the at least one symbol of the at least one PBCH. In some embodiments, all symbols of the at least one PSS comprise a PBCH and at least one symbol of the PBCH only comprises a PBCH. In some embodiments, the first transmission is on side-link.

EXAMPLE

FIG. 8 illustrates an example of PSS transmission for sidelink according to an embodiment of the present disclosure. In this example, the PSS transmission for sidelink is composed of 4 S-PSS transmissions occupying a bandwidth of 44 RBs, and each S-PSS transmission occupies a different 11 RB bandwidth. In this example, a UE sends a first transmission in a slot, where the first transmission is used for synchronization. In this example, the first transmission is side-link primary synchronization signal (S-PSS) transmission. The S-PSS transmission occupies a bandwidth in frequency domain at least greater than 11 resource blocks (RBs). In an example, as illustrated in FIG. 8, the S-PSS transmission occupies M RBs, where M is equal to 44. It is to note that other number greater than 11 can be used. In time domain, the S-PSS transmission is located on one symbol of the slot. Optionally, in an example, the 44 RBs are divided into 4 S-PSS sets, each set contains 11 RBs, and each S-PSS set is generated from a base sequence, i.e. the base sequence of a S-PSS set is generated based on 11 RBs. The base sequence of each S-PSS set can be the same or different. Optionally, if the base sequence of each S-PSS set is the same, these 4 S-PSS sets are identical, which leads to a high peak to average power ratio (PAPR). To further reduce the PAPR, a phase rotation operation can be applied, i.e. each of the S-PSS sets can be applied with a different phase rotation, e.g.

$$S'^{n}_{SPSS}(k) = S^{n}_{SPSS}(k) * e^{j\phi_n}, \text{ for } k = 0, \ldots, 131, n = 0, \ldots, 3$$

$$S'^{n}_{SPSS}(k)$$

is the base sequence of the n-th S-PSS set after applying the phase rotation, and $$S^{n}_{SPSS}(k)$$

is the base sequence of the n-th S-PSS set before applying the phase rotation. Since each S-PSS set has length of 11 RBs, its index k is from 0 to 131 (i.e. each RB has 12 subcarriers, leading to 11 RBs equal to 132 subcarriers). To ensure a low PAPR, set $\phi_i \neq \phi_j$, for i≠j. One example of $\phi_n$ expression can be $$\phi_n = \frac{\pi n}{2}.$$

FIG. 9 illustrates an example of a base sequence according to an embodiment of the present disclosure. In this example, a base sequence of length 127 is used to generate 1st S-PSS set. The same base sequence is used to generate 2nd S-PSS set. There is a gap of more than one subcarrier between two consecutive S-PSS sets. The base sequence of each S-PSS set has a length of N, where N is a prime number that is smaller than the number of the subcarriers of 11 RBs, i.e. 11*12=132. One example is that the base sequence length N=127. As each S-PSS set has 132 subcarriers, the base sequence will be mapped to subcarriers as illustrated in FIG. 9, where only two S-PSS sets are displayed. It is seen that the base sequence is mapped to the center subcarriers of the S-PSS set and leaving some subcarriers non-mapped.

FIG. 10 illustrates an example of a base sequence according to an embodiment of the present disclosure. In this example, optionally, the base sequence length N=131. The base sequence of length 131 is used to generate 1st S-PSS set. The same base sequence is used to generate 2nd S-PSS set. There is a gap of one subcarrier between two consecutive S-PSS sets. FIG. 11 illustrates an example of a base sequence according to an embodiment of the present disclosure. In this example, the base sequence of length 131 is used to generate 1st S-PSS set. The same base sequence is used to generate 2nd S-PSS set. There is no gap between two consecutive S-PSS sets.

FIG. 12 illustrates an example of PSS transmission for sidelink according to an embodiment of the present disclosure. In this example, PSS transmission for sidelink comprises only one S-PSS that occupies 44 RB bandwidth. It is to note that following the same principle, the S-PSS occupies 44 RBs, and this example can also define two S-PSS sets, with each set containing 22 RBs. In this case, the base sequence length N for each S-PSS set can be of length 263 or 257. Optionally, similar principle can be applied for different S-PSS bandwidth (different from 44 RBs). In another example, the S-PSS does not contain multiple S-PSS sets, as illustrated in FIG. 12. In this case, only one base sequence is mapped to the S-PSS subcarriers. The base sequence length is similarly selected as previously presented, i.e. a prime number smaller than the S-PSS bandwidth. In an example, S-PSS bandwidth is 44 RBs, i.e. 44*12=528 subcarriers. Then, the base sequence length is 523 or 521.

FIG. 13 to FIG. 15 each illustrates an example of PSS transmission for sidelink according to an embodiment of the present disclosure. In an example as illustrated in FIG. 13, PSS transmission for sidelink comprises only one S-PSS that occupies 51 RB bandwidth, but the actual RBs in which the PSS is transmitted are a subset of 51 RBs. In this example, 11 RBs are carrying S-PSS. In some examples, the S-PSS base sequence is mapped in an interlaced RBs, as illustrated in FIG. 13, where the S-PSS bandwidth is calculated as the bandwidth from the RB in lowest frequency to the RB in the highest frequency, although the number of used RBs can still be 11 RBs. In an example as illustrated in FIG. 14, the base sequence is generated based on 11 RBs with length N=127 and continuously mapped to 11 RBs. Some subcarriers in the 1st RB and the 11th RB are not used. In an example as illustrated in FIG. 15, splitting the 11 RBs to wider bandwidth with an interlaced pattern is provided. In FIG. 13, the S-PSS bandwidth is 51 RBs, and the used RBs are 11 RBs. Between each used RBs, there is a fixed number RBs that are not used for S-PSS mapping. The base sequence length N is a prime number smaller than 11*12=132 subcarriers, e.g. N=127 or N=131. If we take N=127 as example, the base sequence is mapped to 11 RBs as illustrated in FIG. 14. Then these 11 RBs will be mapped to 11 RB interlaced structure as illustrated in FIG. 15.

Figure 16:
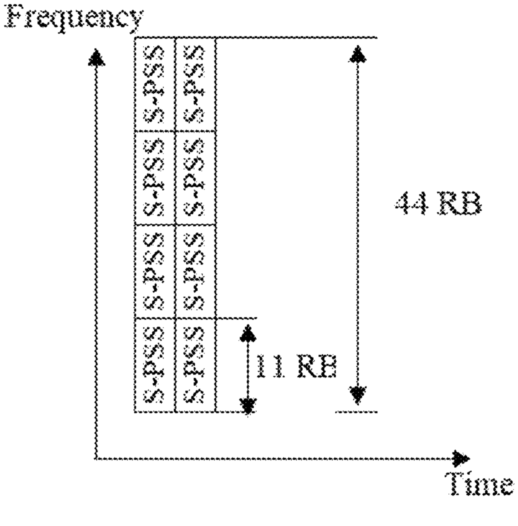
FIG. 16 is a schematic diagram illustrating an example that PSS transmissions for sidelink are located in more than one symbols according to an embodiment of the present disclosure.
Figure 17:
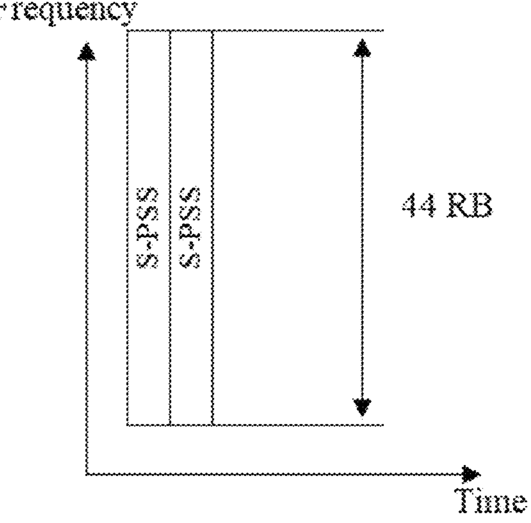
FIG. 17 is a schematic diagram illustrating an example that PSS transmissions for sidelink are located in more than one symbols according to an embodiment of the present disclosure.
Figure 18:
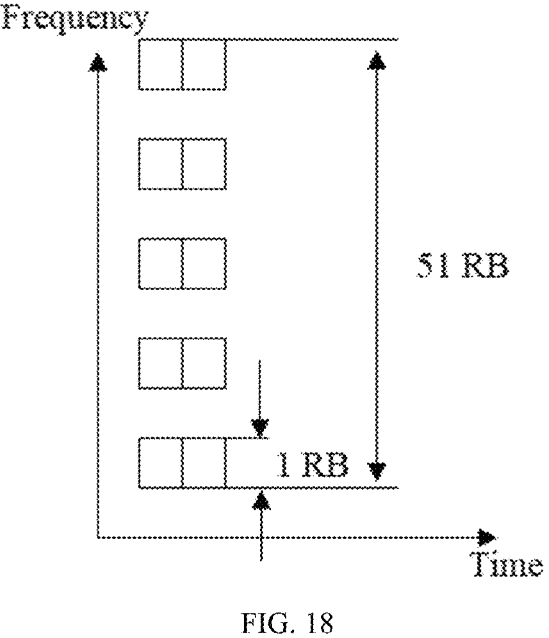
FIG. 18 is a schematic diagram illustrating an example that PSS transmissions for sidelink are located in more than one symbols according to an embodiment of the present disclosure.

Optionally, in time domain, the S-PSS can be located in more than one symbols, as illustrated in FIGS. 16, 17, and 18, where S-PSS transmissions are located in two consecutive symbols. Note that the S-PSS on these two symbols are identical, i.e. time repetition. This can increase the S-PSS coverage. The receiver can increase the S-PSS detection probability based on the S-PSS repetition. Thus, the coverage can be increased up to 3 dB.

Figure 19:
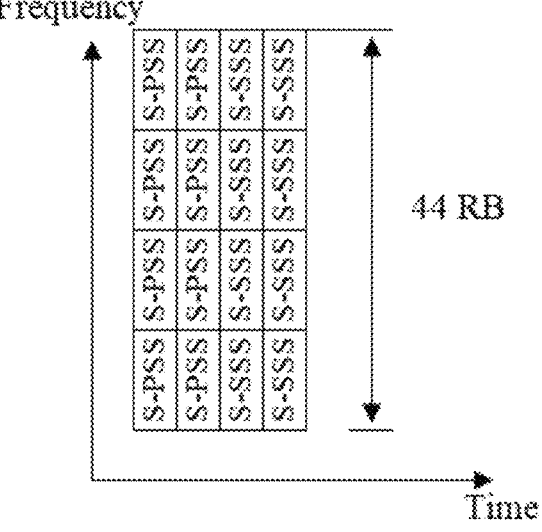
FIG. 19 is a schematic diagram illustrating an example of synchronization signal for sidelink including PSS and SSS according to an embodiment of the present disclosure.
Figures 20, 21:
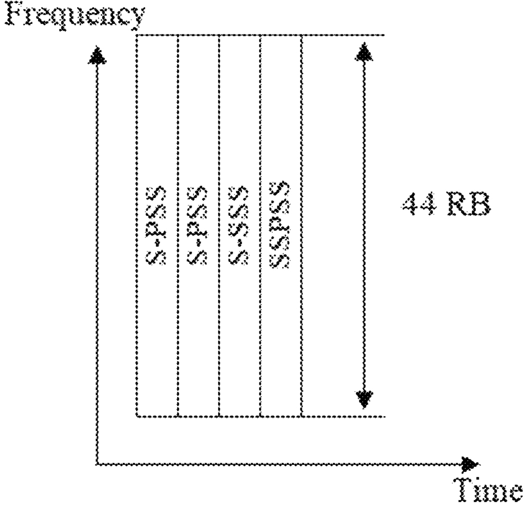
FIG. 20 is a schematic diagram illustrating an example of synchronization signal for sidelink including PSS and SSS according to an embodiment of the present disclosure.
FIG. 21 is a schematic diagram illustrating an example of synchronization signal for sidelink including PSS and SSS according to an embodiment of the present disclosure.

FIG. 19 to FIG. 21 each illustrates an example of synchronization signal for sidelink including PSS and SSS according to an embodiment of the present disclosure. In some embodiments, the synchronization signal for sidelink includes PSS and SSS, where PSS and SSS have the same bandwidth and located in different symbols. Optionally, PSS and SSS are consecutive in time domain. In some examples, the bandwidth of 1 RB is related to subcarrier spacing (SCS). For instance, if SCS=15 KHz, 1 RB bandwidth is 15*12 KHz=180 KHz. But the SCS is increased to 30 KHz, the 1 RB bandwidth is also doubled. Therefore, the selection of S-PSS bandwidth M RBs, is related to the SCS, too. The design principle of some embodiments of the present disclosure is that the bandwidth in Hz corresponding to M RBs should be larger than 80% of 20 MHz, which is 16 MHz. Thus, for SCS=15 KHz, M should be larger than or equal to 16 MHz/180 KHz=88. While for SCS=30 KHz, M should be larger than or equal to 16 MHz/360 KHz=44. In some examples, the first transmission is side-link secondary synchronization signal (S-SSS). Then above design method for S-PSS can be similarly applied to S-SSS, including the S-SSS set, S-SSS bandwidth, S-SSS base sequence length, time domain symbols, and mapping rules, with a difference that the base sequence generation is different from S-PSS. Optionally, the first transmission can contain both S-PSS and S-SSS, and both S-PSS and S-SSS have the same bandwidth, as illustrated in FIG. 19 to FIG. 21, where some embodiments take two symbols for S-PSS and S-SSS as example, while one symbol S-PSS and/or S-SSS can also be used and not presented in the figure. In an example, the S-PSS and the S-SSS transmissions are located in consecutive symbols in the time domain.

Figure 22:
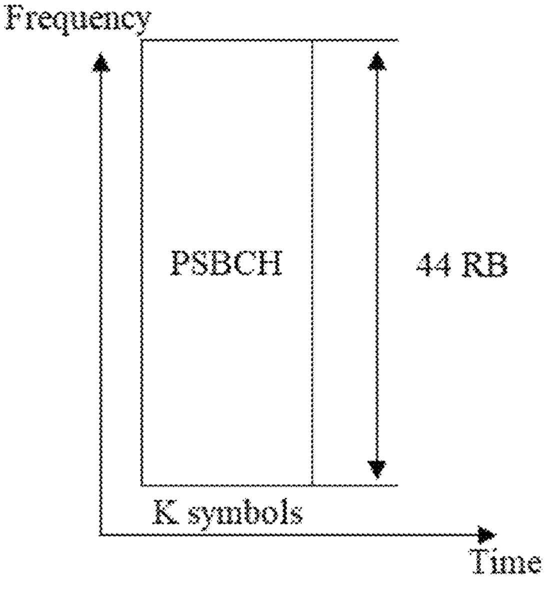
FIG. 22 is a schematic diagram illustrating an example of synchronization signal for sidelink including PBCH according to an embodiment of the present disclosure.
Figure 23:
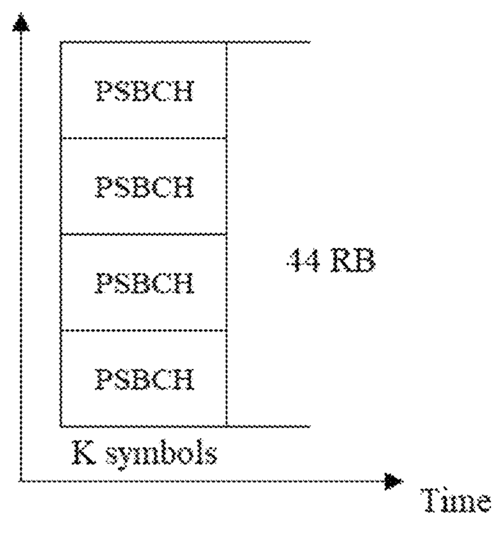
FIG. 23 is a schematic diagram illustrating an example of synchronization signal for sidelink including more than one PBCHs according to an embodiment of the present disclosure.

FIG. 22 illustrates an example of synchronization signal for sidelink including PBCH according to an embodiment of the present disclosure. FIG. 23 illustrates an example of synchronization signal for sidelink including more than one PBCHs according to an embodiment of the present disclosure. In some examples, the first transmission is physical side-link broadcast channel (PSBCH). The PSBCH channel occupies M RBs and K symbols, where M can be determined based on the similar principle presented previously for P-PSS, and K is an integer and has a range from 1 to 13. Optionally, PSBCH occupies 11 RBs and K symbols, but the first transmission contains m PSBCHs, where m is an integer greater than 1. Optionally, the m PSBCHs are carrying the same broadcast information. Optionally, the m PSBCHs are generated in a same way but with different phase rotations.

Figure 24:
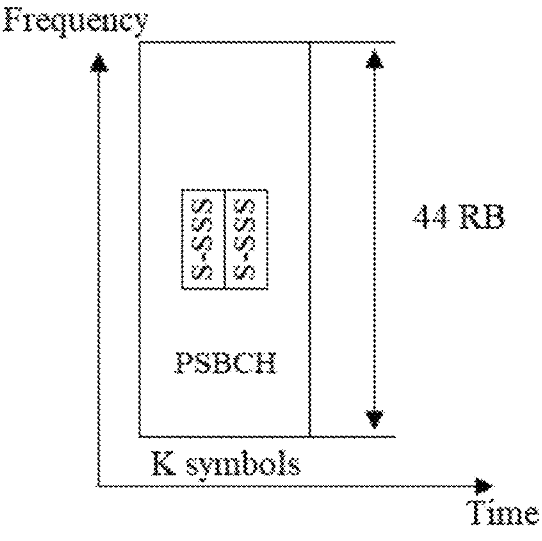
FIG. 24 is a schematic diagram illustrating an example of synchronization signal for sidelink including a PBCH and two SSS transmissions according to an embodiment of the present disclosure.

FIG. 24 illustrates an example of synchronization signal for sidelink including a PBCH and two SSS transmissions according to an embodiment of the present disclosure. Optionally, the first transmission can comprise at least S-SSS and PSBCH. The S-SSS and PSBCH are located in different symbols but have the same bandwidth, e.g. M RBs. Optionally, the PSBCH can surround the S-SSS as illustrated in FIG. 24. Note that the PSBCH in FIG. 24 are located in K symbols where K is larger than 2, because S-SSS transmissions are located in two symbols.

Commercial interests for some embodiments are as follows. 1. solving issues in the prior art. 2. providing a method for sidelink synchronization signal in unlicensed spectrum. 3. providing a good communication performance. 4. providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of “techniques/processes” that can be adopted in 3GPP specification to create an end product. Some embodiments of the present disclosure could be adopted in the 5G NR unlicensed band communications. Some embodiments of the present disclosure propose technical mechanisms.

Figure 25:
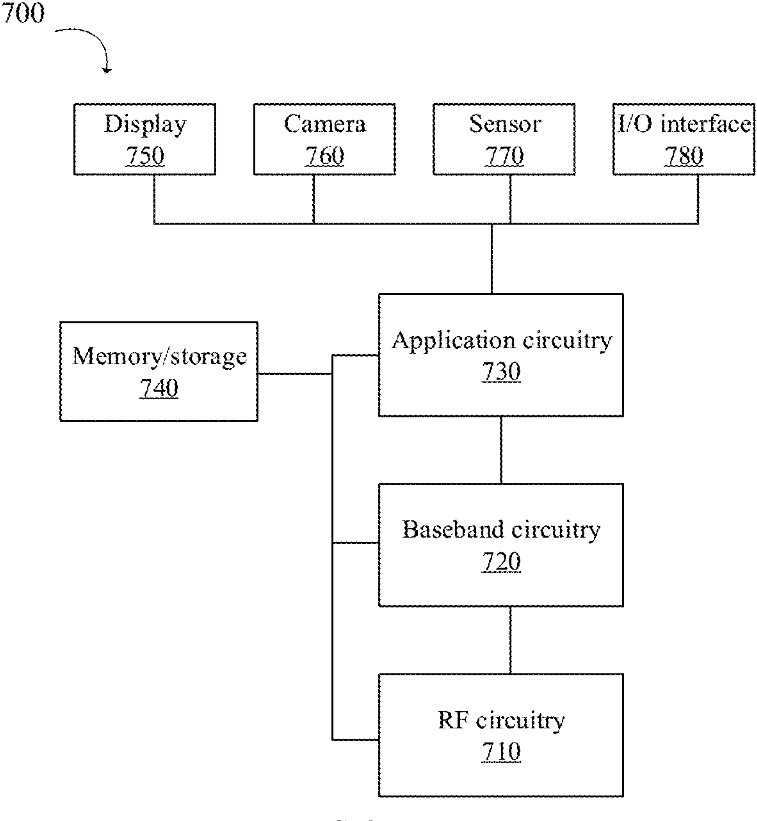
FIG. 25 is a block diagram of a system for wireless communication according to an embodiment of the present disclosure.

FIG. 25 is a block diagram of an example system 700 for wireless communication according to an embodiment of the present disclosure. Embodiments described herein may be implemented into the system using any suitably configured hardware and/or software. FIG. 25 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, “circuitry” may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of transmission of a user equipment (UE), comprising:

transmitting a first transmission, wherein the first transmission is used for synchronization and the first transmission occupies a bandwidth more than 11 resource blocks (RBs), wherein the first transmission comprises M RBs in frequency domain, where M is an integer greater than 11 RBs and M is related to subcarrier spacing and/or a reference bandwidth and/or a number of subcarriers in an RB, and wherein the first transmission is transmitted in a subset of the M RBs;

wherein the first transmission comprises m subset transmissions, where m is an integer greater than or equal to 1;

wherein at least one subset of the m subset transmissions is based on a first base sequence, and a length of the first base sequence is a prime value;

wherein the first transmission comprises at least one primary synchronization signal (PSS) and at least one physical broadcast channel (PBCH), and the at least one PSS and the at least one PBCH are fully or partially overlapped in time domain;

wherein the at least one PBCH comprises at least one symbol, and the at least one PSS is on the at least one symbol of the at least one PBCH.

2. The method of claim 1, wherein the reference bandwidth is 20 MHz.

3. The method of claim 1, wherein the M RBs comprise the RBs from the lowest RB to the highest RB of the first transmission in the frequency domain.

4. The method of claim 1, wherein the m subset transmissions are transmitted in different RBs of the M RBs in the frequency domain.

5. The method of claim 4, wherein the first base sequence has a length related to the values M and/or m and/or a number of subcarriers in an RB;

wherein the m subset transmissions are based on the same first base sequence;

wherein the m subset transmissions are applied with different phase rotations.

6. The method of claim 1, wherein the first transmission is transmitted in K symbols, where K is an integer greater than or equal to 1;

wherein the K symbols are consecutive in time domain.

7. A user equipment (UE), comprising:

a memory;

a transceiver; and a processor coupled to the memory and the transceiver;

wherein the processor is configured to transmit a first transmission, wherein the first transmission is used for synchronization and the first transmission occupies a bandwidth ore than 11 resource blocks (RBs), wherein the first transmission comprises M RBs in frequency domain, where M is an integer greater than 11 RBs and M is related to subcarrier spacing and/or a reference bandwidth and/or a number of subcarriers in an RB, and wherein the first transmission is transmitted in a subset of the M RBs;

wherein the first transmission comprises m subset transmissions, where m is an integer greater than or equal to 1;

wherein at least one subset of the m subset transmissions is based on a first base sequence, and a length of the first base sequence is a prime value;

wherein the first transmission comprises at least one primary synchronization signal (PSS) and at least one physical broadcast channel (PBCH), and the at least one PSS and the at least one PBCH are fully or partially overlapped in time domain;

wherein the at least one PBCH comprises at least one symbol, and the at least one PSS is on the at least one symbol of the at least one PBCH.

8. The UE of claim 7, wherein the reference bandwidth is 20 MHz.

9. The UE of claim 7, wherein the M RBs comprise the RBs from the lowest RB to the highest RB of the first transmission in the frequency domain.

10. The UE of claim 7, wherein the m subset transmissions are transmitted in different RBs of the M RBs in the frequency domain.

11. The UE of claim 10, wherein the first base sequence has a length related to the values M and/or m and/or a number of subcarriers in an RB;

wherein the m subset transmissions are based on the same first base sequence;

wherein the m subset transmissions are applied with different phase rotations.

12. The UE of claim 7, wherein the first transmission is transmitted in K symbols, where K is an integer greater than or equal to 1;

wherein the K symbols are consecutive in time domain.

13. The UE of claim 7, wherein the first transmission is on side-link.

14. A chip, comprising:

a processor, configured to call and run a computer program stored in a memory, to cause a device in which the chip is installed to execute operation of:

transmitting a first transmission, wherein the first transmission is used for synchronization and the first transmission occupies a bandwidth more than 11 resource blocks (RBs), wherein the first transmission comprises M RBs in frequency domain, where M is an integer greater than 11 RBs and M is related to subcarrier spacing and/or a reference bandwidth and/or a number of subcarriers in an RB, and wherein the first transmission is transmitted in a subset of the M RBs;

wherein the first transmission comprises m subset transmissions, where m is an integer greater than or equal to 1;

wherein at least one subset of the m subset transmissions is based on a first base sequence, and a length of the first base sequence is a prime value;

wherein the first transmission comprises at least one primary synchronization signal (PSS) and at least one physical broadcast channel (PBCH), and the at least one PSS and the at least one PBCH are fully or partially overlapped in time domain;

wherein the at least one PBCH comprises at least one symbol, and the at least one PSS is on the at least one symbol of the at least one PBCH.

* * * * *